(12) United States Patent
Bafekr (10) Patent No.: US 10,771,857 B2
(45) Date of Patent: Sep. 8, 2020

(54) VIDEO STREAM AD REPLACEMENT (71) Applicant: GOLD LINE TELEMANAGEMENT INC., Markham (CA)

(72) Inventor: Arash Bafekr, Markham (CA)

(73) Assignee: GOLD LINE TELEMANAGEMENT INC., Markham, ON ( * ) Notice: Subject to any disclaimer, the term of this patent is extended or adjusted under 35 U.S.C. 154(b) by 0 days.

(21) Appl. No.: 14/982,944

(22) Filed: Dec. 29, 2015

(65) Prior Publication Data

US 2017/0188115 A1 Jun. 29, 2017

(51) Int. Cl.
H04N 21/234 (2011.01)
H04N 21/266 (2011.01)
H04N 21/431 (2011.01)
H04N 21/439 (2011.01)
H04N 21/44 (2011.01)
H04N 21/442 (2011.01)
H04N 21/858 (2011.01)
H04N 21/81 (2011.01)
H04N 21/658 (2011.01)
H04N 21/258 (2011.01)
H04N 21/2668 (2011.01)

(52) U.S. Cl.
CPC ..... *H04N 21/812* (2013.01); *H04N 21/25866* (2013.01); *H04N 21/2668* (2013.01); *H04N 21/44222* (2013.01); *H04N 21/6582* (2013.01)

(58) Field of Classification Search
None
See application file for complete search history.

(56) References Cited

U.S. PATENT DOCUMENTS

2004/0025174 A1* 2/2004 Cerrato .............. H04N 21/2668
725/9
2004/0163101 A1 8/2004 Swix et al.
(Continued)

FOREIGN PATENT DOCUMENTS

EP 2464133 A1 6/2012
WO 2004072761 8/2004

OTHER PUBLICATIONS

"Gracenote's Ad Replacement System That Personalizes TV Commercials Will Start Trials in 2013", TechCrunch article, Dec. 26, 2012.
(Continued)

*Primary Examiner* — Brian T Pendleton
*Assistant Examiner* — Jean D Saint Cyr (57) ABSTRACT

Systems and methods for replacing an existing advertisement in a digital video stream with replacement advertisements that are targeted to a user's characteristics include an ad policy manager receiving a notification of an existing advertisement in a video stream and identifying users watching the video stream as it is being broadcast by a broadcaster over a packet-switched network. The ad policy manager may then select one or more replacement advertisements unique to each user and instruct the broadcaster to transmit the selected replacement advertisement(s) in place of the existing advertisement, forming a replacement video stream that is unique to that user. The ad policy manager may then track the viewing of the replacement advertisement(s) in the replacement video stream.

19 Claims, 9 Drawing Sheets

(56) References Cited

U.S. PATENT DOCUMENTS

| | | | |
|---|---|---|---|
| 2004/0244035 A1* | 12/2004 | Wright | H04H 20/28 |
| | | | 725/32 |
| 2006/0282319 A1* | 12/2006 | Maggio | G06Q 30/0217 |
| | | | 705/14.19 |
| 2008/0215437 A1* | 9/2008 | Levy | G06Q 30/0264 |
| | | | 705/14.54 |
| 2009/0077580 A1 | 3/2009 | Konig et al. | |
| 2009/0222853 A1* | 9/2009 | White | H04N 21/25891 |
| | | | 725/34 |
| 2009/0259551 A1 | 10/2009 | Chenard et al. | |
| 2010/0269128 A1 | 10/2010 | Gordon | |
| 2012/0151532 A1* | 6/2012 | Del Sordo | H04N 21/4383 |
| | | | 725/59 |
| 2012/0316965 A1 | 12/2012 | Mathews et al. | |
| 2013/0077940 A1 | 3/2013 | Shackleton et al. | |
| 2014/0196085 A1 | 7/2014 | Dunker et al. | |
| 2015/0156566 A1* | 6/2015 | Sansom | H04N 21/4722 |
| | | | 725/59 |
| 2015/0297949 A1* | 10/2015 | Aman | G06T 7/246 |
| | | | 348/157 |
| 2015/0325268 A1 | 11/2015 | Berger et al. | |
| 2015/0356609 A1* | 12/2015 | Shiota | G06Q 30/02 |
| | | | 705/14.58 |

OTHER PUBLICATIONS

International Search Report and Written Opinion dated Mar. 8, 2017 in relation to PCT Application No. PCT/CA2016/051469, filed on Dec. 13, 2016.

Extended European Search Report dated Apr. 24, 2019 in related European Patent Application No. EP 16880216 (9 pages).

Interactive Advertising Bureau, "IAB Digital Video Ad Serving Template (VAST)—Version 1.8", Jul. 29, 2008 (Jul. 29, 2008), XP055105841, retrieved from the Internet: URL:http://www.iab.net/media/file/VAST-1_8_pub_comment_FINAL.pdf (17 pages).

* cited by examiner

| User Identification | | | | | | |
|---|---|---|---|---|---|---|
| User IP | | | | | | |
| Advertisement Name | Advertisement Media URL | Tracking URL 1 | Tracking URL 2 | Expiry of Tracking URLs | Duration | Cost |
| ... | ... | ... | ... | ... | ... | ... |

- UpdateUserStatus (viewerID, channelName, language, broadcasterIP, activityStatus) ⎫ S510
  - *return* void
- AdPreparation (viewerID, region, language, deviceType, userAgent, IPAddress) ⎫ S520
  - AdRequest (language, region, IPAddress, deviceType, userAgent, AdNetwork, minDuration, maxDuration, quantity)
    - *return* (Ad[], mediaFileInfo[], duration[])  ⎫ S530
  - SavePool (viewerID, AdUrl[], Duration[], trackingUrl[][4]) ⎫ S540
    - *return* void
  - DownloadNewMediaFilesToNAS (mediaFileInfo[]) ⎫ S560
    - *return* void
- PoolAndViewersHouseKeeping ()
  - DeleteInfoAndPoolForInactiveUsers()
    - *return* void

FIG. 8

- AdDetected (channelName, AdName, duration, time) ⎱S610
  - FindUsersWatchingChannel (channelName) ⎱S620
    - *return* usersWatchingChannel []
  - FindBestMatchesForUsers (duration, usersWatchingChannel [], userAdPool [][]) ⎱S630
    - *return* bestMatch []
  - AdReplacement (channelName, duration, time, usersWatchingChannelonBroadcaster[], bestMatch[]) ⎱S640
    - *return* void
  - *return* void

- Authorize (viewerID, broadcasterIP, channelName, sessionID, userIP) ⎫ S710
  o AddTrackingUrlsLaunchTimes () ⎫
    ▪ *return* void                    ⎬ S720
  o ChangeAdStatusToWatched ()     ⎭
    ▪ *return* void
  o *return* void
- LaunchTrackingUrlsAtTheCorrectTimes () ⎫ S730
  o *return* void
- Release (viewerID, broadcasterIP, channelName, sessionID, userIP) ⎫ S740
  o RemoveTrackingUrlsLaunchTimes () ⎫ S750
    ▪ *return* void
  o ReportToActivity (viewerID, channelName, AdUrl, durationWatched) ⎫ S760
    ▪ *return* void
  o *return* void
- AdPoolManagement ()
  o DeleteExpiredAdsFromPool ()
    ▪ *return* void
  o RefillAdsInPool ()
    ▪ *return* void
  o *return* void

US 10,771,857 B2

VIDEO STREAM AD REPLACEMENT

TECHNICAL FIELD

This relates to video processing and, in particular, to replacing existing advertisements in a digital video stream with replacement advertisements targeted to a user's characteristics.

BACKGROUND

Traditional linear television is premised on a common audience viewing the same television program. Each viewer receives the same program and the same advertising.

Modern packet-switched networks (e.g. the internet) present the opportunity to stream video on-demand to individual viewers/users. Not surprisingly, targeted advertising may be streamed in association with such on-demand video.

Packet-switched networks also present the opportunity to deliver linear television channels to viewers on varied devices. Indeed, many television channels are now delivered over the internet, allowing for greater channel selection and wider geographic reach. Often these channels include traditional advertisements, destined to a common audience.

There accordingly remains a need to allow better targeted advertising as linear television channels are delivered over a packet-switched network.

SUMMARY

According to an aspect, there is provided a method that includes receiving notification that an existing advertisement has been detected in a video stream representing a linear channel of content, identifying users watching the linear channel being broadcast by a broadcaster over a packet-switched network, and selecting, for each user, a replacement advertisement based on a unique identifier for that user.

The method further includes instructing the broadcaster to transmit to each user, over the packet-switched network, the replacement advertisement for that user retrieved from an advertisement server in place of the existing advertisement to form a replacement video stream unique to that user, and tracking viewing of the replacement advertisement in each replacement video stream.

According to another aspect, there is provided a computer system, the system including at least one processor, a network adapter in communication with the at least one processor, and a memory in communication with the at least one processor. The memory stores instructions that, when executed by the at least one processor in response to being notified that an existing advertisement has been detected in a video stream representing a linear channel of content, causes the computer system to identify users watching the linear channel of content being broadcast by a broadcaster over a packet-switched network.

The computer system selects from an advertisement server a replacement advertisement for each user based on a unique identifier for that user, and instructs a broadcaster to transmit to each user, over the packet-switched network, the replacement advertisement for that user in place of the existing advertisement to form a replacement video stream unique to that user. The computer system tracks, by notification from the broadcaster, viewing of the replacement advertisement in each replacement video stream.

According to another aspect, there is provided a method including detecting in near-real time an existing advertisement in a video stream representing a linear channel of content, and a start time and a duration of the existing advertisement. The method includes identifying users watching the linear channel over a packet-switched network and selecting from an advertisement server a replacement advertisement for each user based on a unique identifier for that user. The method replaces, for each user, the existing advertisement in the video stream with the replacement advertisement to form a replacement video stream unique to that user, and each replacement video stream is transmitted to each user over the packet-switched network. The method further includes tracking viewing of the replacement advertisement by each of the users in each replacement stream.

A non-transitory computer-readable medium is also disclosed, having computer executable instructions stored thereon for execution by one or more computers, that when executed implement a method as described herein.

Other features will become apparent from the drawings in conjunction with the following description.

BRIEF DESCRIPTION OF THE DRAWINGS

In the figures which illustrate example embodiments.

DETAILED DESCRIPTION

Figure 1:
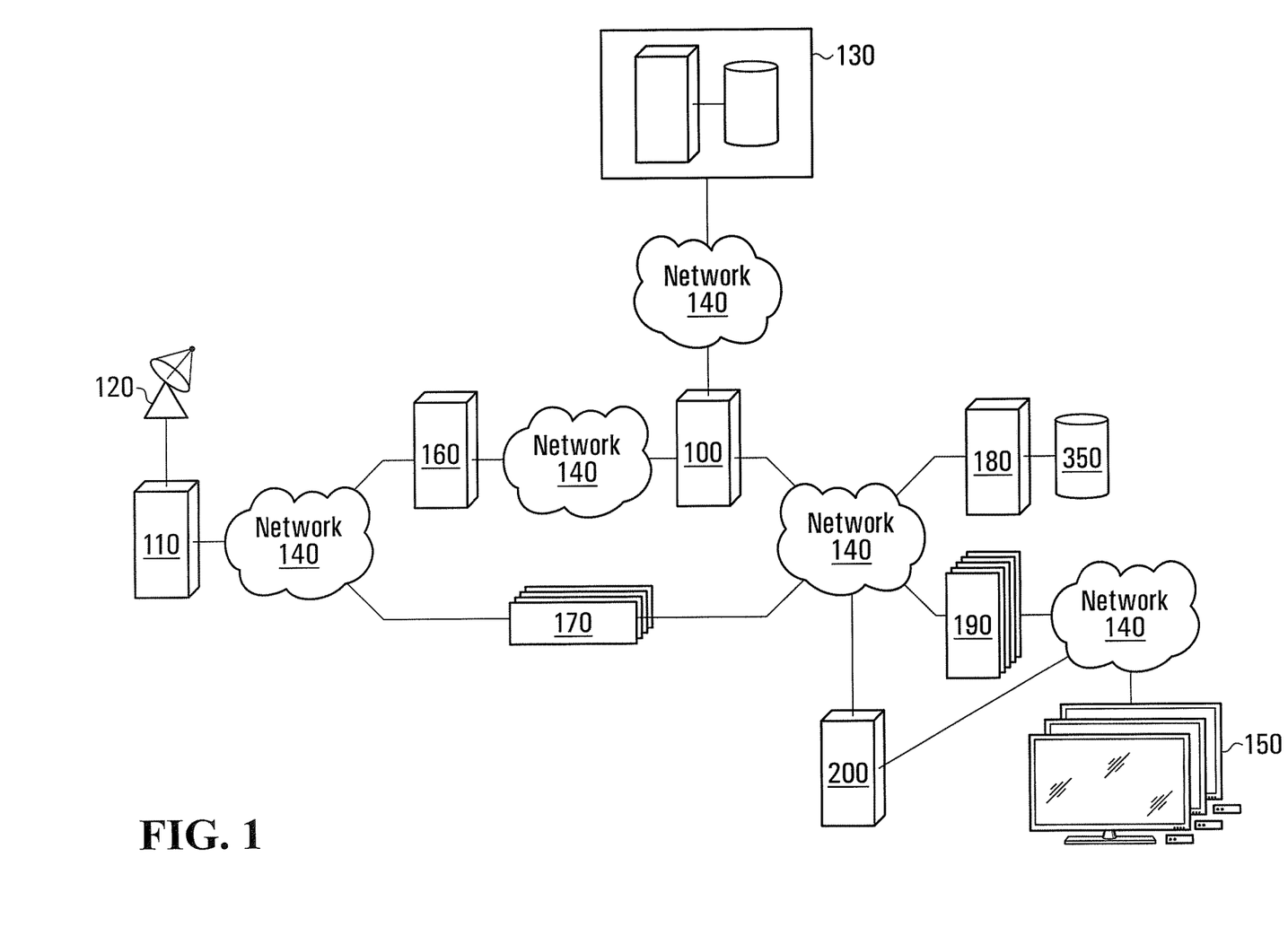
FIG. 1 is a schematic diagram of an operating environment of an example embodiment.

FIG. 1 is a schematic block diagram illustrating an operating environment of an example embodiment.

As illustrated, a video source 120, illustrated by way of example as a satellite dish, is in communication with an integrated receiver/decoder 110. Integrated receiver/decoder 110 is in communication with an ad detector 160 and audio/video transcoders 170 by way of a network 140. Network 140 may, for example, be a packet-switched network, in the form of a LAN, a WAN, the public Internet, a Virtual Private Network (VPN) or the like. An ad policy manager 100 is in communication with ad detector 160, an ad server 130, an ad buffering server 180, and broadcasters 190 by way of network 140. Transcoders 170 are also in communication with data network broadcasters 190 by way of network 140. Data network broadcasters 190 are in communication with end-user client devices 150 by way of network 140. A subscriber manager 200 is in communication with ad policy manager 100, broadcasters 190 and client devices 150 by way of network 140.

Video source 120 may be a source of conventional video for redistribution to client devices 150. Video source 120 may, for example, take the form of one or more satellite dishes, or one or more terrestrial television sources, a cable television source or other video feed. In the example of a satellite dish as video source 120, the satellite dish transmits an electrical signal to integrated receiver/decoder 110. The signal may, for example, contain multiple linear television channels that may be digital or analog. In some embodiments, the signal is a digital video broadcasting (DVB) signal, for example a terrestrial digital video broadcasting (DVB-T) signal or a satellite digital video broadcasting (DVB-S) signal. In the example of a DVB signal, at integrated receiver/decoder 110 the DVB signal is demodulated to recover an MPEG transport stream, for example, an MPEG 2 transport stream (MP2TS) or MPEG 4 transport stream (MP4TS) from the DVB signal. The MPEG transport stream(s) may be de-multiplexed and each MPEG transport stream may be encapsulated in an Internet Protocol (IP) stream for transmission over an IP network as an IP MPEG stream. The MPEG transport stream may, for example, be encapsulated using the real time streaming protocol (RTSP), the IPTV protocol, or other suitable protocol.

Each encapsulated MPEG stream is forwarded to transcoders 170 and ad detector 160. Transcoders 170 receive each MPEG stream which may then be transcoded into a suitable format and re-encapsulated. For example transcoders 170, may transcode each transport stream from MPEG 2 to MPEG 4 (H.264) if necessary, for transmission over multiple MP4TS broadcasting streams to broadcasters 190. As will be appreciated, transcoders 170 may concurrently transcode multiple streams received from video source 120.

Broadcasters 190 broadcast the MPEG streams received from transcoders 170 to client devices 150 across network 140, as instructed by subscriber manager 200. As will become apparent, broadcasters 190 may originate a single IP stream for each device viewing a particular video stream. Accordingly, broadcasters 190 may broadcast a single IP stream from transcoder 170 to originate multiple IP streams, each destined for a different one of multiple client devices 150.

Subscriber manager 200 interfaces between client devices 150, broadcasters 190 and ad policy manager 100, and may function as middleware. Subscriber manager 200 may be a conventional computing server (e.g. including network interface, processor, memory, and suitable software) that manages end-users and content at client devices 150. To that end, subscriber manager 200 may authenticate client devices 150, respond to programming requests (e.g. requests for particular channels or other content) and communicate with broadcasters 190. Software at subscriber manager 200, may for example, authenticate client devices 150 based on a user ID and password, and receive user request from client devices 150 over network 140 to tune to a particular channel. Subscriber manager 200 may respond to these requests to direct broadcasters 190 to stream a selected channel to a particular device 150 (by for example identifying the requested change and IP address, MAC address, or other identifier of client device 150 to broadcasters 190). As a user views the channel, subscriber manager 200 may respond to requests for client device 150 of that user to pause or change the channel by appropriately providing messages over network 140 to broadcasters 190 to stream a different channel or pause streaming in response to the user request. Conveniently then, subscriber manager 200 may collect data reflecting any particular user's viewing habits, and be aware of which channel a user is viewing at any time, as well as any request to pause or change a channel (including during an advertisement, as further discussed below).

Client devices 150 are associated with end-users and may be, for example, set-top boxes connected to a user's television screen or display device, cellular telephones, tablets, or other suitable devices. Typically, at least one client device is associated with an end-user—typically a subscriber—for viewing audio/visual programs, such as a linear television channel, streamed over network 140. For example a set-top box may be connected to a standard television receiver by a composite cable or HDMI cable for display on a user's television screen. The MPEG transport stream may be received at one of client devices 150, for example, encapsulated in IP packets transported over Ethernet. The IP MPEG packets are then extracted to obtain the transport stream. If necessary, the transport stream is decoded, and the program stream extracted from the transport stream. The program stream is then de-multiplexed to create a video signal that can be displayed, for example, on a user's television screen through a composite video or HDMI connection.

Ad detector 160 may be a computing device that receives a copy of the MPEG stream from video source 120 that is provided to transcoder 170. Ad detector 160 analyses the MPEG stream to identify existing advertisements present in the digital video stream, in near real-time. Identification of existing advertisements, for example, can occur with minimal delay such that the disruption is not perceivable to a user at client device 150. The identification of existing advertisements may occur in near real-time, with perhaps a seven (7) to eight (8) second delay. Ad detector 160 may, for example, analyse the in-band signal of the video stream or audio stream to identify portions thereof matching a predetermined pattern representative of an advertisement in a stream. Ad detector 160 may, for example, store indicators of advertisements commonly received by video source 120. In an embodiment, ad detector 160 may construct (or be provided with) a database of advertisements, including an identifier of an advertisement in a video stream. The database may be constructed automatically, or with aid of an administrator, and store sufficient data to allow detector 160 to detect with some degree of confidence, the presence of a known advertisement in a video stream. The database may contain the length of each identified advertisement (e.g. in seconds).

Conveniently, ad detector 160 may rely on the repetition of advertisements within a linear channel. That is, for any particular linear channel provided by video source 120, ad detector 160 assumes that included advertisements are chosen (and often repeated) from a known bank of advertisements.

In some embodiments, ad detector 160 may use a system analogous to the analysis of the video stream or audio stream described above to identify program content in the MPEG stream. This program content can be compared to a signature dataset to determine what particular content is being streamed to a user in addition to existing advertisements, and this information sent to ad policy manager 100 for use in arranging for the replacement of existing advertisements with replacement advertisements.

Alternatively, ad detector 160 may use other information to identify the program content. For example, ad detector 160 may use electronic program guide data, or third party program guide data to determine the current program being provided by video source 120.

Ad detector 160, upon detecting an advertisement in an MPEG stream, may communicate the detection to ad policy manager 100. Ad detector 160 may for example, provide ad policy manager 100 information relating to the name of the channel streaming the existing advertisement, the name of the existing advertisement, the duration of the existing advertisement, and the time at which the existing advertisement starts playing, over network 140.

In an optional example, following detection of an existing advertisement by ad detector 160, advertisement detection information may be inserted, for example, using a Society of Cable Telecommunication Engineers 35 protocol (SCTE-35) inserter, in a video stream, for example, MP2TS or MP4TS, and sent to a broadcaster for cable companies.

Ad policy manager 100, in response to receiving an indication of an existing advertisement in a stream, may arrange for the replacement of the existing advertisement with one or more replacement advertisements selected from a pool of advertisements tailored to an individual user's characteristics, received from ad server 130 and stored at ad buffering server 180. The selection of the replacement advertisement may be determined by applying a best-match algorithm to select which advertisement(s) from a user's ad pool are to be used as replacement advertisement(s). Advertisements within the ad pool may be maintained in list 380, depicted in FIG. 4. The best-match algorithm may be based, for example, on the length of the existing advertisement that is being replaced, the length of the advertisements in the user's ad pool (as identified from list 380), and the cost of each advertisement in user's ad pool. The best-match algorithm may select one or more advertisements from a user's ad pool with a maximal combined duration that does not exceed the length of the existing advertisements that is being replaced, as well as advertisement(s) with a cost providing maximal revenue. The best-match algorithm may also be based on content type from video source 120, as further detailed below. Broadcaster 190 may then replace the corresponding replacement advertisement in place of the existing advertisement, to be played on the user's client device 150.

Ad policy manager 100 may be a conventional computing server that manages the replacement of existing advertisements, received from source 120, in the MPEG transport streams that are broadcast to client devices 150 by broadcasters 190. Replacement advertisements may be received from a commercial ad server 130.

Ad server 130 may be a conventional advertisement server that may be operated by a third party on a separate computing device external from ad policy manager 100. Ad server 130 may be, for example, a video advertising platform that hosts an inventory of video advertisements managed by a third party. A request for advertisements is sent from ad policy manager 100 to ad server 130, based on a unique identifier of a user—typically reflecting the user's characteristics, for example, language, region and content played.

Data on a user's characteristics, which may include user identification, language, region, device type, user agent, user IP address may be stored at client device 150 and may be provided to ad policy manager 100 by subscriber manager 200.

Subscriber manager 200 may communicate with ad policy manager 100 to provide further information about each user, including what each user is currently viewing, a viewing profile of the user and other information. Subscriber manager 200 may, for example, communicate the content an end-user is viewing on a client device 150 to ad policy manager 100. Data on a user's characteristics and content viewed on a client device 150 may be provided to ad policy manager 100 from subscriber manager 200, based on unique identifiers (e.g. user ID/password/cookies, etc.) stored at client device 150, and sent back to subscriber manager 200, which then notifies ad policy manager 100 of activity of client device 150.

Data on a user's characteristics at ad policy manager 100 can be used to formulate an advertisement request, tailored for a particular user, based on their characteristics. This request is then sent to ad server 130 to retrieve replacement advertisement information.

The request to ad server 130 for advertisements may be made in Video Ad Serving Template (VAST) format, as a VAST request. As will be appreciated, VAST is a specification standard released by the Interactive Advertising Bureau™ for communicating with an advertisement server. Ad server 130 may be a VAST-compliant advertisement server, as for example detailed in the Interactive Advertising Bureau Video Ad Serving (VAST), Version 3.0 Specification, published Jul. 19, 2012, the contents of which are hereby incorporated by reference. An example of a VAST-compliant ad server 130 is an advertisement network administered by SpotX™.

A VAST request may be in the form of a HTTP-based request which can contain query strings to define a type of advertisement being requested from ad server 130. The query strings in a VAST request may be pre-defined for particular parameters, for example language. These parameters are used to select potential replacement advertisements that will be assigned to a user.

One possible parameter in a VAST request may define an author of the advertisement being requested. A VAST request may initially be made for an advertisement that is authored by the operator of ad policy manager 100, followed by a separate request for an advertisement authored by a third-party, or any author. As will be appreciated, the number of advertisements requested from ad server 130 can be arbitrarily apportioned as between those authored by the operator of ad policy manager 100 and those authored by a third-party. In some embodiments, it may be desirable to prioritize VAST requests for advertisements authored by the operator of ad policy manager 100 to maximize the number of advertisements authored by the operator of ad policy manager 100.

Following a request for an advertisement from ad policy manager 100, ad server 130 provides a response to ad policy manager 100 with information on an advertisement based on the parameters of the advertisement request. This advertisement may be authored by a third-party, or by the operator of ad policy manager 100. The response can include details such as the advertisement media that should be played, how the advertisement media should be played, and what should be tracked as the media is viewed. Advertising media files identified in a response from ad server 130 may be downloaded from ad server 130 by ad policy manager 100 to be stored on ad buffering server 180.

Ad buffering server 180 may be a conventional computing server on which advertisements associated with a particular user are stored, for example, in a network shared file system (NAS) 350. Advertisements stored on ad buffering server 180 may be downloaded from ad server 130 by ad policy manager 100. The ad policy manager 100 may call on the ad buffering server 180 to retrieve a replacement advertisement in a transport stream to be inserted into an MPEG transport stream channel that is being broadcast by a broadcaster 190 to a user. The replacement advertisement may overlay the existing advertisement in whole or in part. Broadcaster 190 may then play the retrieved replacement advertisement at the appropriate time, as determined by the ad policy manager 100, in near real-time such that the MPEG transport stream is not delayed by any amount perceivable by the user at client device 150. Playing or viewing of the replacement advertisement may then be reported to ad server 130, for example, by ad policy manager 100 calling VAST-complaint tracking URLs.

As will become apparent, in the presence of ad policy manager 100 and ad buffering server 180, communication with client devices 150 does not require VAST standard compliance at client devices 150. Rather client devices 150 need only be able to decode a suitable internet audio/video stream for presentation. As such, client devices 150 may comprise only a TCP/IP communication connection and a video player.

Figure 2:
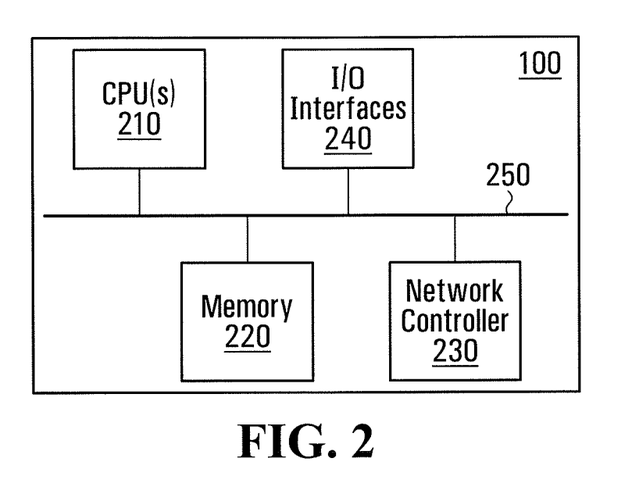
FIG. 2 is a high-level block diagram of an ad policy manager computing device, exemplary of an embodiment.

FIG. 2 is a high-level block diagram of a computing device, exemplary of an ad policy manager 100. As will become apparent, ad policy manager 100, under software control, receives notifications from ad detector 160 of existing advertisements detected in the MPEG stream, selects replacement advertisements tailored to a user's characteristics, notifies each relevant broadcaster 190 to play the replacement advertisement to the user and tracks the playing of the replacement advertisement by each broadcaster 190 and viewed by the user.

As illustrated, ad policy manager 100, a computing device, includes one or more processors 210, memory 220, a network controller 230 and one or more I/O interfaces 240 in communication over bus 250.

Processor(s) 210 may be one or more Intel x86, Intel x64, AMD x86-64, PowerPC, ARM processors or the like.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, and the like. Optionally, network controller 230 may be accessed via the one or more I/O interfaces.

Software instructions are executed by processor(s) 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Figure 3:
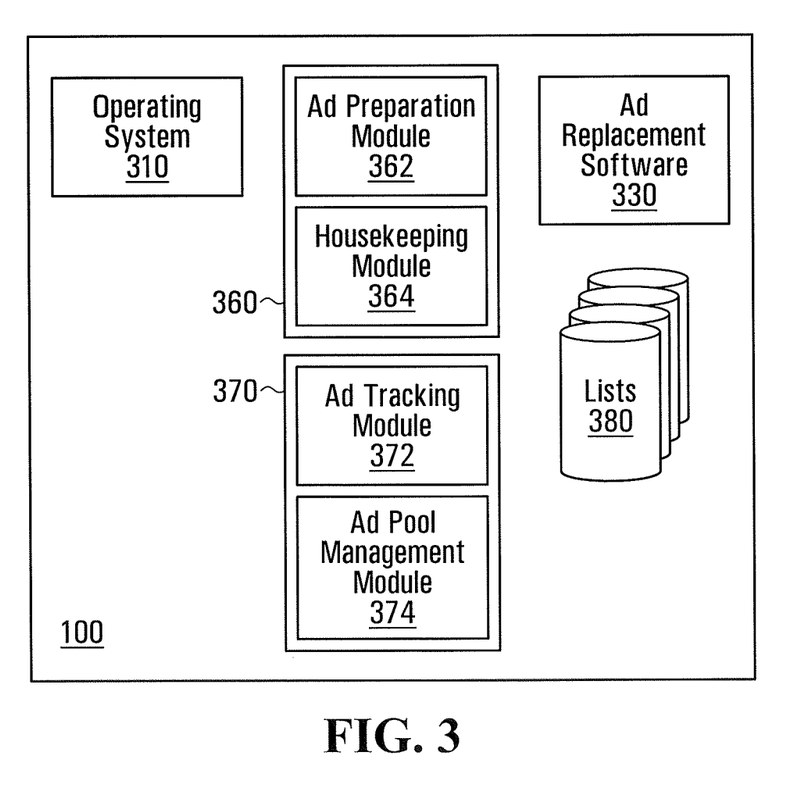
FIG. 3 illustrates the organization of software at the computing device of FIG. 2.

FIG. 3 depicts a simplified organization of example software components and data stored within memory 220 of ad policy manager 100. As illustrated, these software components include operating system (OS) software 310, ad pool software 360, ad replacement software 330, ad tracking software 370, and ad lists database 380.

OS software 310 may be, for example, Microsoft Windows, UNIX, Linux, Mac OSX, or the like. OS software 310 allows ad replacement software 330 and video stream software 340 to access one or more processors 210, memory 220, network controller 230, and one or more I/O interfaces 240 of the computing device.

Ad pool software 360 adapts ad policy manager 100, in combination with OS software 310, to operate as a server for collecting a list of entries of advertisements associated with each user from which a replacement advertisement may be selected. A pool of potential replacement advertisements for each user is prepared and managed in ad lists 380. These potential replacement advertisements are based on the response to the advertisement request sent to ad server 130.

Figure 4:
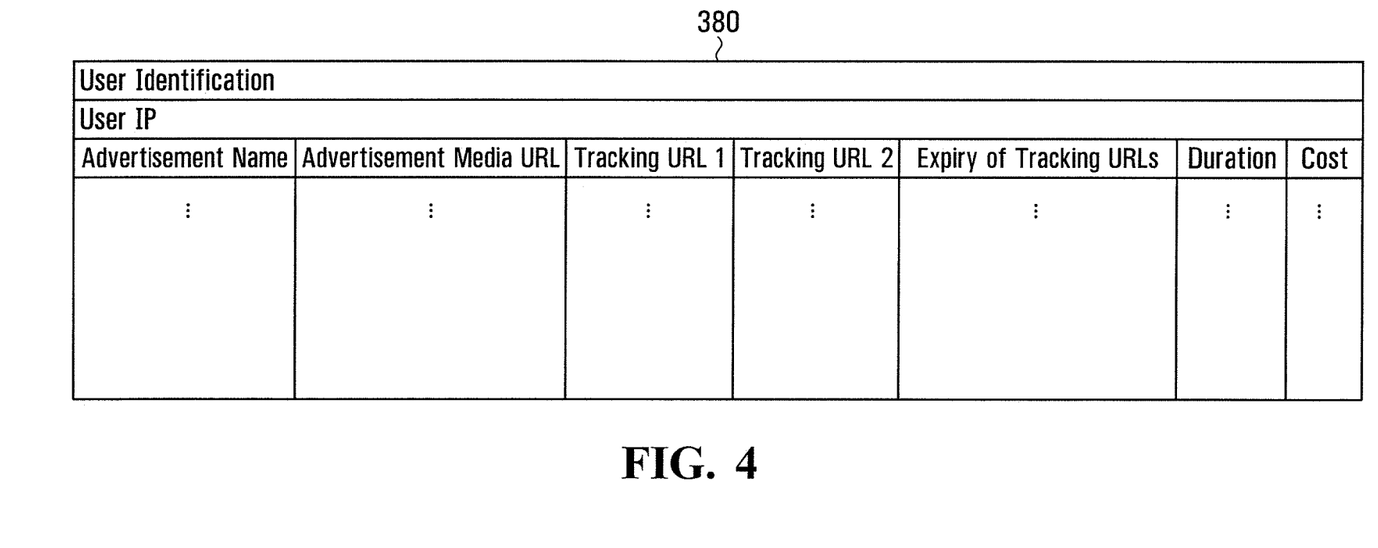
FIG. 4 illustrates an example of an ad list for a user maintained by the software of FIG. 3.

An example of an ad pool in a list 380 is illustrated in FIG. 4. Ad policy manager 100 maintains an associated pool in list 380 for each user that identifies advertisements targeted to that user. A separate list 380 may be maintained for each user of single client device 150. A user's ad list 380 stores information about the user obtained from subscriber manager 200, for example the user's identification, the user's IP address, channel streaming to the user, the IP address of broadcaster 190 broadcasting to the user's client device 150, as well as entries containing information about advertisements for the user in the user's pool, such as, for each advertisement, the name of the advertisement, the URL of the advertisement media file, tracking URLs, an expiry time of the tracking URLs, duration, and cost of the advertisement.

The advertisement media file linked at the URL of the advertisement media file may be stored in NAS 350 of ad buffering server 180. Advertisement media files are not typically stored in list 380.

Tracking URLs may contain query strings that contain identifying parameters, such as the name of the advertisement, a duration of time (e.g. ad length), and an identifier for ad policy manager 100 that requested the advertisement. These parameters may be used to report to ad server 130 when an advertisement is viewed, or when specific events occur.

The tracking URLs associated with an entry in an ad in a user's ad pool (as identified in list 380) have an associated expiry date and time. For example, the tracking URLs associated ad in a user's pool may expire eight (8) minutes after the advertisement information has been retrieved from ad server 130. Accessing the tracking URL prior to its expiry may result in a credit to the benefit of ad policy manager 100, while access after expiry would result in no such credit.

The revenue associated with an advertisement in a user's ad pool (as maintained in list 380) may be, for example, the effective cost per thousand impressions, namely the advertising revenue generated per thousand impressions.

As will become apparent, ad pool (as maintained in list 380) for each user may be updated from time to time to maintain a current list of advertisements to be served to an associated user, the update being performed by ad pool management module 374. As advertisements are served to a user, or as they expire, new advertisements may be added to the ad pool and maintained in list 380 for that user. An advertisement in a user's ad pool may expire, for example, if the advertisement's tracking URLs have expired, as discussed in further detail below.

Ad pool software 360 may include one or more submodules. As illustrated, ad pool software 360 includes ad preparation module 362 for obtaining advertisements and advertisement information from ad server 130 and housekeeping module 364 for keeping track of what users' information and users' ad pools (e.g. in list 380) should be deleted based on some criteria.

Ad replacement software 330 adapts ad policy manager 100, in combination with OS software 310, to operate as a server for instructing broadcasters 190 to replace an existing advertisement in a digital video stream with one or more replacement advertisements.

Ad replacement software 330 prepares advertisement replacement for a particular client's video stream provided by video source 120 (FIG. 1) once an existing advertisement has been detected by ad detector 160, and ad replacement software 330 instructs the appropriate broadcaster 190 to replace the existing advertisement with one or more replacement advertisements for a particular user.

The replacement advertisement(s) for a particular user are selected from that user's ad pool using list 380, based on the best-match algorithm based, for example, on the length of the existing advertisement that is being replaced, the length of the advertisements in user's ad pool (as maintained in list 380), and the value of each advertisement in user's ad pool The best-match algorithm may select one or more advertisements from a user's ad pool (as identified in list 380) with a maximal combined duration that does not exceed the length of the existing advertisements that is being replaced, as well as advertisement(s) with a cost providing maximal revenue.

Ad tracking software 370 tracks the viewing of a replacement advertisement by a user and manages a user's ad pool to ensure that a list of advertisements is available in list 380 from which a replacement advertisement can be selected.

Ad tracking software 370 may include one or more submodules. As illustrated, ad tracking software 370 includes ad tracking module 372 for tracking the play time and duration of a replacement advertisement, and ad pool management module 374 for keeping track of advertisements' expiration dates and deleting expired advertisement entries from a user's ad pool when they expire, as indicated by list 380 for that user, as well as calling ad preparation module 362 to fill a user's ad pool when the advertisements available in a user's ad pool are less than a specified threshold.

Expiry of an advertisement entry from a user's ad pool may occur when the advertisement's tracking URLs have expired. A user's ad pool containing expired advertisement entries may be refilled by calling ad preparation module 362 when ad policy manager 100 receives an indication of an existing advertisement in a stream from ad detector 160. This may avoid throttling of such requests by ad server 130 in response to too many requests being sent to ad server 130 in rapid succession.

The operation of ad preparation module 362 of ad pool software 360 is described with reference to the flowchart of FIG. 5. Blocks S520 and onward are performed by processor(s) 210 executing ad preparation module 362 at ad policy manager 100. Ad preparation module 362 is called when ad policy manager 100 receives notification from subscriber manager 200 that a user has started playing content for the first time (for example, turns on a client device 150 such as a set-top box, or requests a channel from a mobile application), there is a change to the user's settings, for example, a change to the user's IP address, or there is a change to the language package the user is watching, as shown at block S510.

At block S520, one or more processors 210 send a request for relevant advertisements for a user to ad server 130. The request may be a VAST request, and ad server 130 may be a VAST-compliant advertisement server such as a SpotX advertisement server. Ad server 130 contains an inventory of advertisements managed by a third party.

The VAST parameters sent in the VAST request may be determined based on a user's characteristics such as language, region and content played in order for the ad server 130 to tailor the provided advertisements to match a user's interests. The data on a user's characteristics may be obtained from subscriber manager 200 that is in communication with client device 150 over network 140, for example, using cookies. The data on a user may include the user's ID, detection of content type from video source 120, and profiling of a user's characteristics.

At block S530, following a request for an advertisement from ad policy manager 100, ad server 130 provides a response to ad policy manager 100 based on the parameters of the advertisement request, in the form of an advertisement entry for the user's ad pool in a list 380. The advertisement entry for the user's ad pool received by ad policy manager 100 may be in the form of a VAST response from ad server 130. Information on an advertisement contained in the entry may include, for example, name of the advertisement, duration of the advertisement, and an expiration date of the tracking URLs after which an advertisement is expired. The response can also include details such as the advertisement media that should be played, how the advertisement media should be played, and what should be tracked as the media is viewed. In the event that ad server 130 does not have enough advertisements available that meet the request parameters, a response from ad server 130 may not conform with the parameters of the request. For example, a request to ad server 130 may request the language Farsi. However, if no Farsi advertisements are available in ad server 130, the response may contain details of an advertisement that is in English instead. A response from ad server 130 may be in the form of a VAST data structure containing these parameters in Extensible Markup Language (XML).

Tracking URLs may be provided, for example, by ad server 130 in the VAST response received after a request was made by ad policy manager 100. When the advertisement is played as a replacement advertisement at client device 150, ad tracking module 372 calls a tracking URL containing parameters which are then reported to the source of the tracking URL, for example ad server 130. For example, tracking URLs may be accessed to report to ad server 130 to indicate when a replacement advertisement starts playing, when an event occurs during the playback of the replacement advertisement (such as a timing event, for example, 30 seconds has elapsed), and when an advertisement has completed playback.

Use of the VAST standard for communication between ad policy manager 100 and ad server 130 enables the use of tracking URLs to track when advertisement media is played or viewed, and by tracking and reporting to a VAST-compliant ad server 130 that an advertisement has been played, operators of ad policy manager 100 may earn revenue based on the advertisement being played, therefore monetizing the content from video source 120. Tracking when an advertisement is viewed allows for advertising revenue to be received, for example, based on cost per impression of the advertisement when it is fetched from ad server 130 or based on the events reported from the tracking URLs as described above, therefore monetizing the content from video source 120. To limit click fraud, in which a legitimate user viewing an advertisement is imitated, ad policy manager 100 may be a trusted publisher such that ad server 130 has confidence that an advertisement has actually been played when the appropriate tracking URLs (discussed below) are triggered.

At block S540, entries containing information about the advertisements provided by ad server 130 in a user's ad pool are stored in list 380 of the user for whom the VAST requests were sent.

At block S550, processor(s) 210 evaluate the information on the advertisement received at block S540 to determine whether the advertisement is new, and is being seen by ad policy manager 100 for the first time. If the advertisement is new, control flow proceeds to block S560.

At block S560, the new advertisement is downloaded into the NAS 350 of ad buffering server 180. These advertisements can be accessed by broadcasters 190, when instructed by ad policy manager 100 to replace an existing advertisement in the IP stream being broadcast to a user with a replacement advertisement.

Advertisement media files downloaded to NAS 350 from ad server 130 may be formatted or transcoded by ad preparation module 362 before being stored in NAS 350 of ad buffering server 180 so that the advertisement media file is compatible with the digital video stream being broadcast by broadcasters 190 to user client devices 150.

Returning to FIG. 3, housekeeping module 364 of ad pool software 360 tracks users' information and which lists 380 should be deleted based on some criteria. For example, the criteria may be a user being inactive for a specified period of time and the user's ad pool has expired, in which case the user's information and ad pool would be deleted. In some embodiments, a user's entire ad pool expires when any advertisement entry has not been used for more than eight (8) minutes.

The operation of ad replacement software 330 is described with reference to the flowchart of FIG. 6. Blocks S620 and onward are performed by processor(s) 210 executing ad replacement software 330 at ad policy manager 100.

When an existing advertisement is detected in the MPEG stream by ad detector 160, the name of the channel streaming the existing advertisement, the name of the existing advertisement being streamed, the duration of the existing advertisement, and the time at which the existing advertisement starts showing, as determined by ad detector 160, is notified to ad policy manager 100 at block S610.

At block S620, processor(s) 210 identifies all broadcasters 190 and the users watching the channel streaming the existing advertisement.

At block S630, processor(s) 210 selects, for each user watching the channel identified in block S620, one or more replacement advertisements to replace the existing advertisement, selected from the list of advertisements prepared and managed in each user's ad pool (as maintained in list 380), determined on the basis of a best-match algorithm based, for example, on the length of the existing advertisement that is being replaced, the length of the advertisements in user's ad pool (as identified in list 380), and the value of each advertisement in the user's ad pool. The best-match algorithm may select one or more advertisements from a list 380 with a maximal combined duration that does not exceed the length of the existing advertisements that is being replaced, as well as advertisement(s) with a cost providing maximal revenue.

At block S640, each broadcaster 190 currently streaming the channel with the existing advertisement are notified of the replacement advertisement information and the replacement advertisement or list of replacement advertisements to be played instead of the existing advertisement for each user by transmitting over network 140 to each corresponding client device 150 an IP stream containing the user's replacement advertisement or advertisements from the NAS 350 of ad buffering server 180.

Returning to FIG. 1, once a broadcaster 190 is notified of the replacement advertisement information for a particular user, broadcaster 190 will play the corresponding replacement advertisement from the NAS 350 at ad buffering server 180 in place of the existing advertisement. When a replacement advertisement starts playing for a particular user, broadcaster 190 calls ad tracking software 370 on ad policy manager 100 and notifies ad tracking software 370 of the replacement advertisement that the user is viewing. Ad policy manager 100 also notifies subscriber manager 200 that the replacement advertisement has started playing for the user, allowing subscriber manager 200 to track the user's viewing habits.

The operation of ad tracking module 372 of ad tracking software 370 is described with reference to the flowchart of FIG. 7. Blocks S720 and onward are performed by one or more processors 210 executing ad tracking module 372 at ad policy manager 100.

Figure 7:
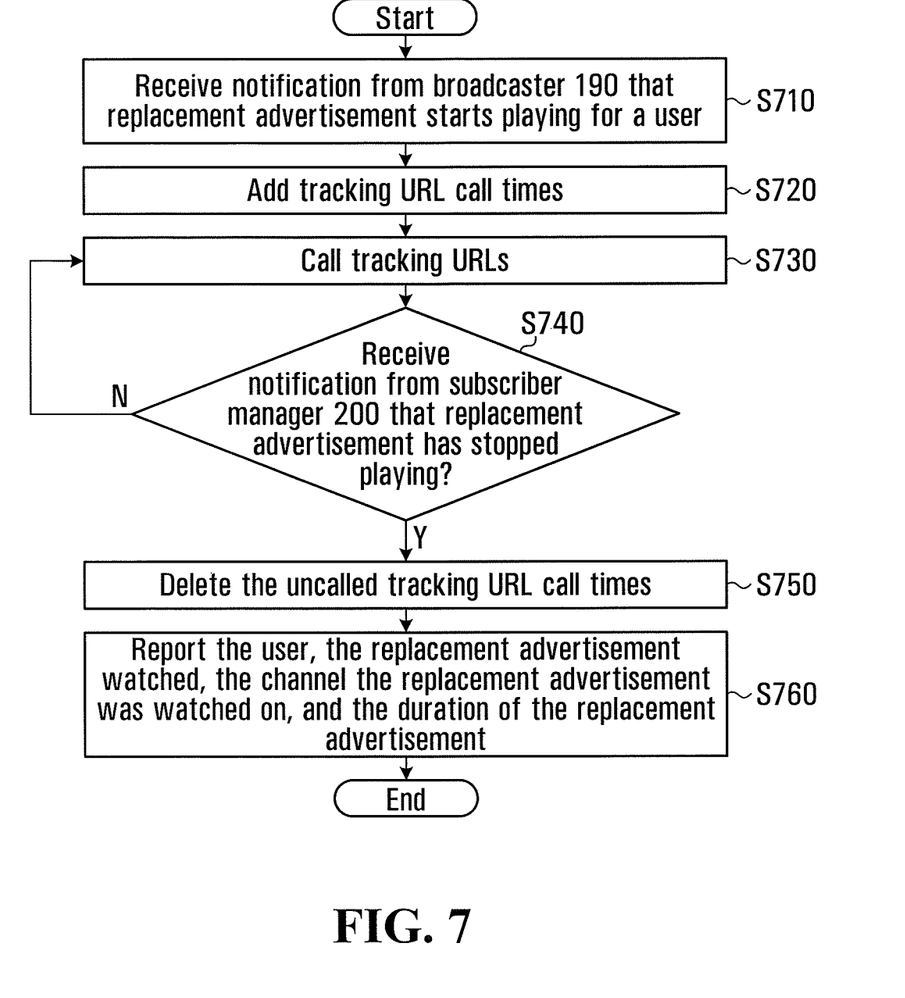
FIG. 7 is a flow chart of a method of tracking a replacement advertisement, performed by the software of FIG. 3.

As illustrated in FIG. 7, at block S710 broadcaster 190 notifies ad tracking module 372 at ad policy manager 100 that the replacement advertisement has started playing.

At block S720, ad tracking module 372 adds tracking URL call times for the replacement advertisement which is being played for a particular user.

At block S730, tracking URLs are called, in some embodiments every second. Periodically, the calling times for all tracking URLs for all the users are checked. When a tracking URLs is due it is called and the record deleted. In this way, playback of the replacement advertisement can be tracked, for example by indicating the portion of the replacement advertisement that was played and viewed by a user (in whole or in part). When a tracking URL is called, this provides playback data to the URL source, for example, ad server 130, that a particular event has occurred, for example, a replacement advertisement has been 50% played, or a replacement advertisement has been 100% played. The playback data of the replacement advertisement can be used, in some embodiments, to provide ad policy manager 100 with information on the performance of the replacement advertisement, or relayed to ad server 130, and from there to the advertising content owner to facilitate a cost per impression paid by the advertiser.

At block S740, processor(s) 210 evaluate if a notification has been received from subscriber manager 200 that the replacement advertisement has stopped playing. If not (i.e., the replacement advertisement remains playing), control flow returns to block S730 to continue to call tracking URLs. Otherwise, the user has stopped viewing the replacement advertisement or the replacement advertisement has finished playing, control flow proceeds to block S750.

At block S750, one or more processors 210 delete the uncalled tracking URL call times of the replacement advertisement for that user.

At block S760, ad tracking module 372 stores the user, the replacement advertisement watched, the channel the replacement advertisement was watched on, and the duration of the replacement advertisement that was actually viewed by the user. Video analytics may be applied to measure, analyse and report the viewing of the replacement advertisement. This information may be used for statistical analysis, for example, to study the consumption patterns of users, or to cross-reference with the data obtained at the source of the tracking URLs, for example, ad server 130.

Ad pool management module 374 of ad tracking software 370 (FIG. 3) may delete an advertisement entry from the ad pool (as in list 380) if the advertisement entry has expired, which may be checked frequently and/or at a specified time interval.

For example, each time a replacement advertisement is played and/or every time an expired advertisement entry is deleted from the ad pool, the number of advertisement entries available in a user's ad pool is compared with a specified threshold. If the number of advertisement entries in a user's ad pool (as indicated by list 380) is less than the specified threshold, ad preparation module 362 is called to refill the list of advertisements in the ad pool.

Figure 5:
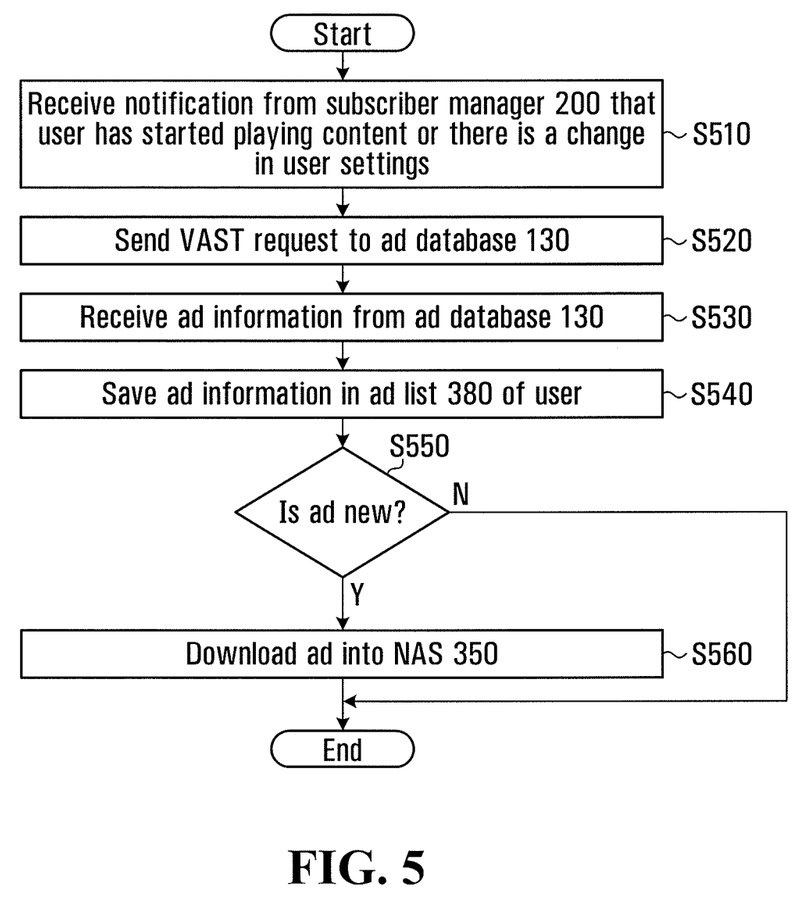
FIG. 5 is a flow chart of a method for preparing a list of replacement advertisements used by the software of FIG. 3.
Figure 8:
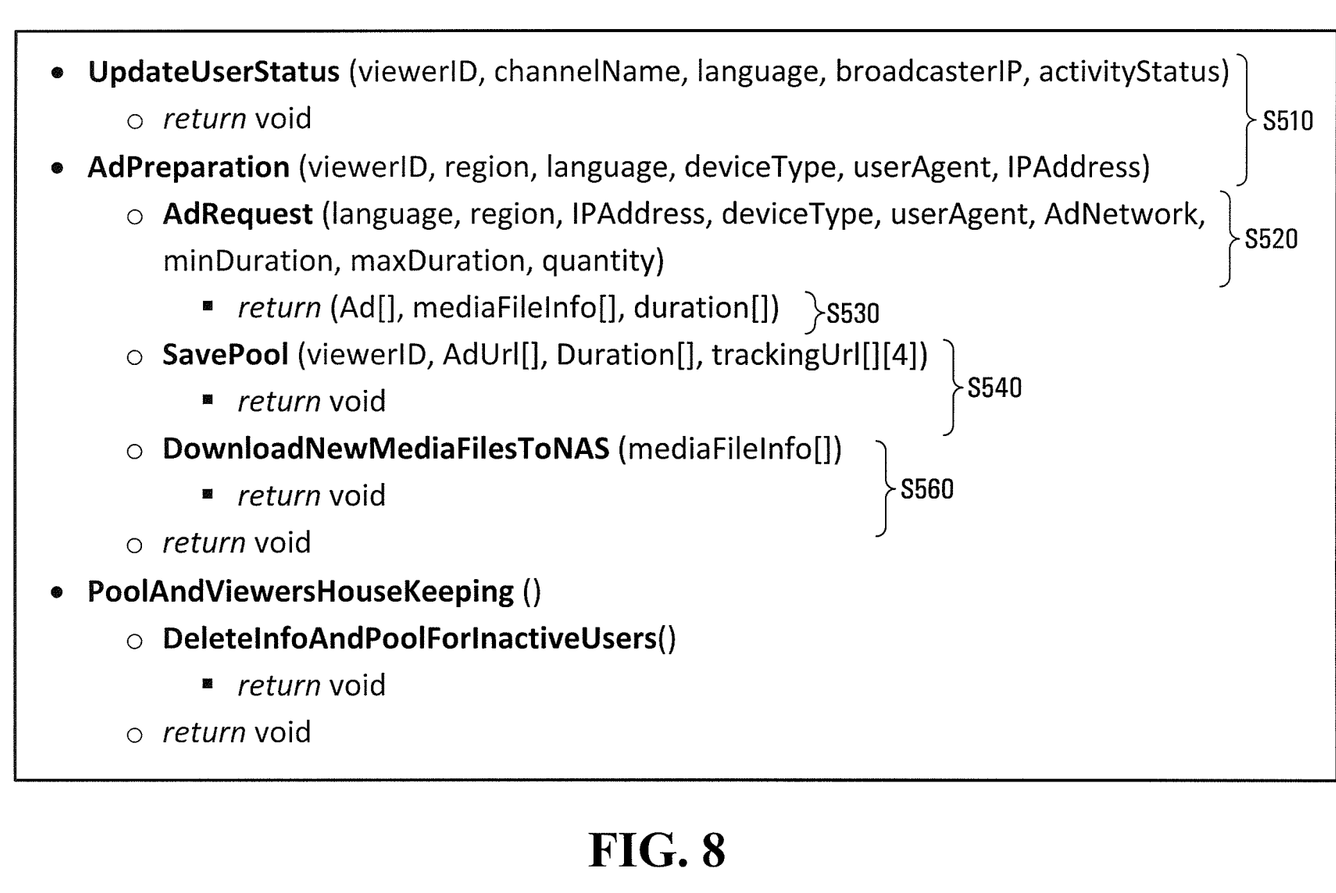
FIGS. 8-10 illustrate examples of high-level pseudo-code of the software of FIG. 3.

FIG. 8 lists the pseudo-code for one possible implementation for ad pool software 360 of FIG. 3, performing steps of FIG. 5, implemented on ad policy manager 100. In an implementation of ad preparation module 362 of ad pool software 360, UpdateUserStatus( ) determines first content play, change of IP address, or language change to call AdPreparation( ) AdPreparation( ) first calls AdRequest( ) to request advertisements from ad server 130. Next, SaveList( ) is called to save the advertisement information received from ad server 130 as an entry in a user's ad pool in a list 380. If the received advertisement information is for a new advertisement which has not been seen by ad policy manager 100, DownloadNewMediaFilesToNAS( ) is called to download the advertisement media file to NAS 350 of ad buffering server 180. In an implementation of housekeeping module 364 of ad pool software 360, the method ListAnd-ViewersHouseKeeping( ) is called both when a user goes inactive and periodically for housekeeping, comprising DeleteInfoAndListForinactiveUsers( ) which deletes a user's information and a user's ad pool based on whether the user is inactive for a specified period of time and his/her ad pool is expired.

Figure 6:
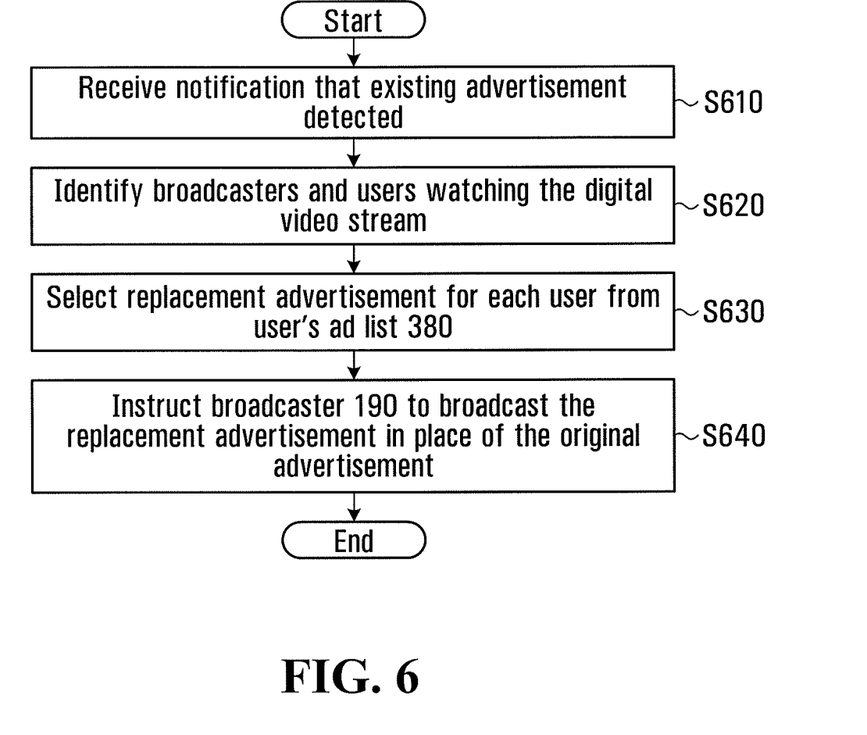
FIG. 6 is a flow chart of a method of instructing a broadcaster to replace an advertisement in a video stream, performed by the software of FIG. 3.
Figure 9:
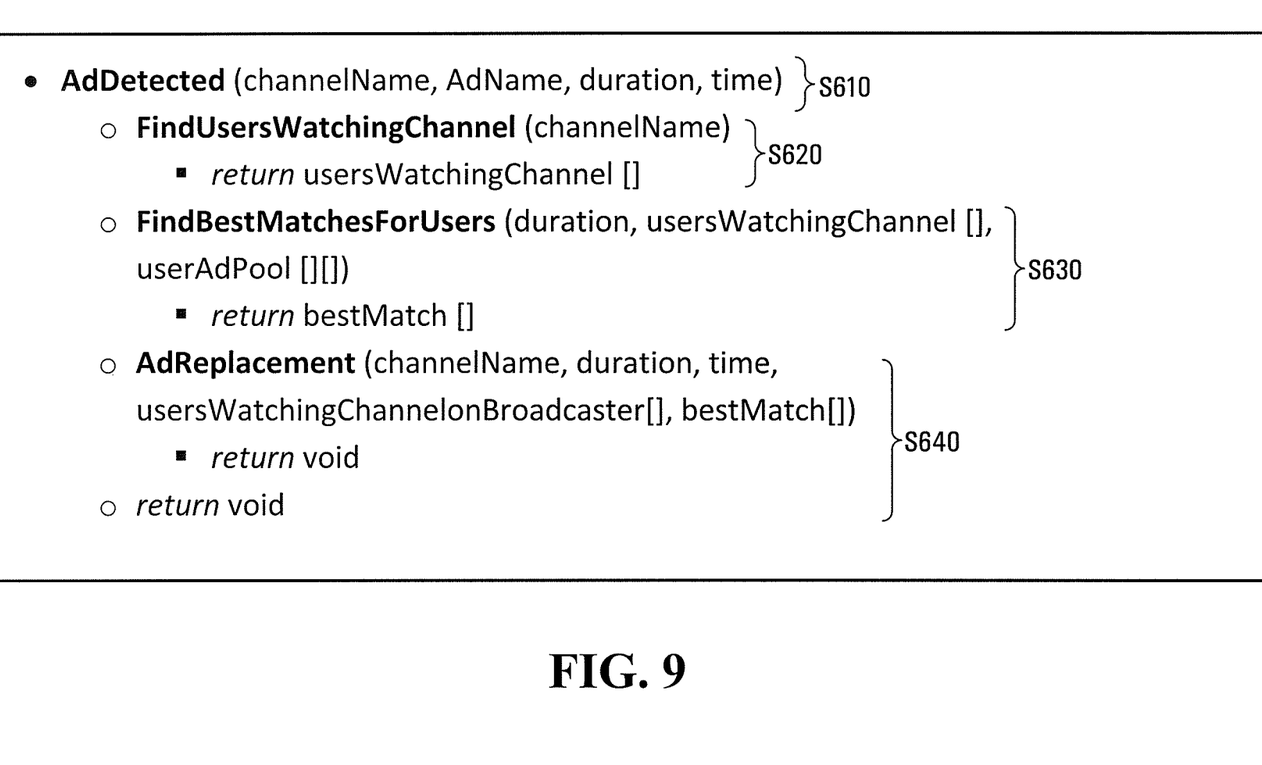

FIG. 9 lists the pseudo-code for one possible implementation for ad replacement software 330 of FIG. 3, performing steps of FIG. 6. AdDetected( ) is called when an existing advertisement is detected in an MPEG stream by ad detector 160. AdDetected( ) first calls FindUsersWatchingChannel( ) to find all users watching the channel streaming the advertisement, and, for each user watching that channel, calls FindBestMatchesForUsers( ) to select the best replacement advertisement in the user's ad pool. AdReplacement( ) is called on each broadcaster notifying the broadcaster 190 of the replacement advertisement information and to play the replacement advertisement from the NAS 350.

Figure 10:
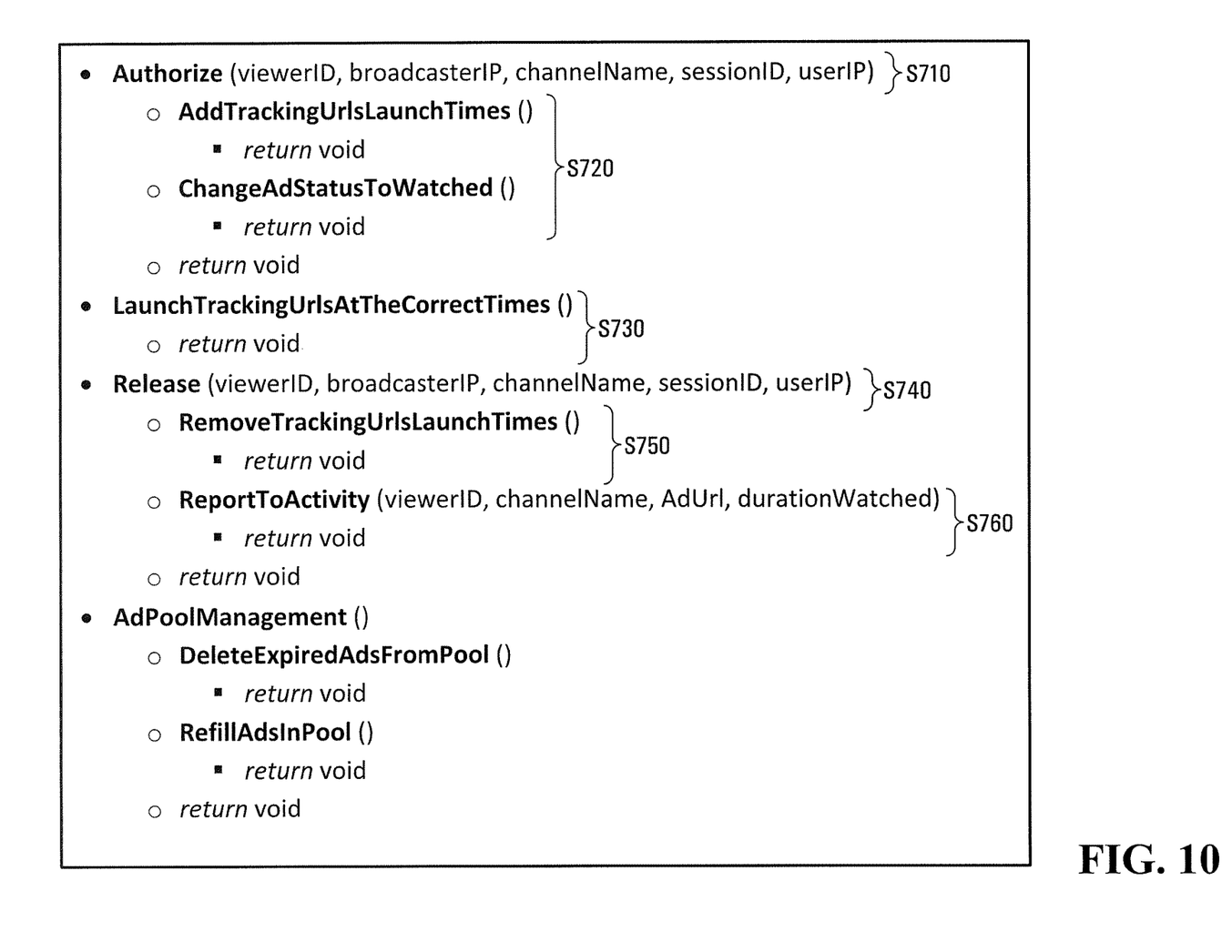

FIG. 10 lists the pseudo-code for one possible implementation for tracking software 370 of FIG. 3, performing steps of FIG. 7. In an implementation of ad tracking module 372 of tracking software 370, when a replacement advertisement starts playing for a particular user, broadcaster 190 calls the Authorize( ) method, notifying ad policy manager 100 about the replacement advertisement that is playing. Authorize( ) calls AddTrackingUrlsCallTimes( ) to add tracking URLs call times for the replacement advertisement which is being played for that specific user, and ChangeAdStatusToWatched( ) to change the status of the replacement advertisement to watched. CallTrackingUrlsAtTheCorrectTimes( ) is called periodically every second checking the calling times for all tracking URLs for all users and calling the ones that are due and then deleting these records. The Release( ) method is called by subscriber manager 200 if at any point in time the user stops viewing the replacement advertisement or if the replacement advertisement finishes playing, at which point RemoveTrackingUrlsCallTimes( ) is called, deleting the uncalled tracking URLs call times of the replacement ad for that user, and ReportToActivity( ) is called asynchronously reporting the user, the replacement advertisement watched, the channel the replacement advertisement was watched on, and the duration that was actually viewed by the user.

In an implementation of ad pool management module 374 of tracking software 370, AdListManagement( ) keeps track of the expiry dates of advertisement entries in the ad pool (in list 380), and DeleteExpiredAdsFromList( ) deletes the expired advertisement entries from the ad pool when they expire, at a specified time interval. RefillAdsInList( ) calls the AdPreparation( ) method shown in FIG. 8 when the advertisements available in a user's ad pool are less than a specified threshold, and is called every time an advertisement is decided to be played as a replacement advertisement and every time an expired advertisement entry is deleted from list 380.

Of course, the above described embodiments are intended to be illustrative only and in no way limiting. The described embodiments are susceptible to many modifications of form, arrangement of parts, details and order of operation. This is intended to encompass all such modification within its scope, as defined by the claims.

What is claimed is:

1. A method comprising:
retrieving a plurality of lists of advertisements from an external advertisement server, where each list in the plurality of lists of advertisements:
is associated with a corresponding user device among a plurality of user devices; and
contains a plurality of entries, each entry among the plurality of entries referencing a replacement advertisement for the corresponding user device;
wherein the retrieving is based, at least in part, on a characteristic of a user associated with the corresponding user device;
downloading, from the external advertisement server and for each user device among the plurality of user devices, a plurality of replacement advertisements among the replacement advertisements referenced by entries contained in the list associated with the each user device;
storing, at an advertisement buffering server, the plurality of replacement advertisements downloaded from the external advertisement server;
receiving notification that an existing advertisement has been detected in a video stream, the video stream further containing program content, and the video stream representing a linear channel of content;
identifying specific user devices among the plurality of user devices, where the specific user devices are playing back the linear channel as provided by a broadcaster over a packet-switched network;
selecting, for each user device among the specific user devices, a particular replacement advertisement from among the plurality of replacement advertisements downloaded for the each user device from the external advertisement server, the selecting based, at least in part, on a length of the existing advertisement;
notifying the broadcaster of the particular replacement advertisement to be played at the specific user devices instead of the existing advertisement;
instructing the broadcaster to unicast, to each of the specific user devices, over the packet-switched network, each particular replacement advertisement, accessed from the advertisement buffering server, instead of the existing advertisement;
receiving, from the broadcaster, notification that the particular replacement advertisement has started playing at each user device among the specific user devices; and
responsive to the receiving notification that the particular replacement advertisement has started playing, tracking, by calling a tracking URL associated with the particular replacement advertisement, playback of the particular replacement advertisement at each user device among the specific user devices.

2. The method of claim 1, wherein the retrieving is based, at least in part, on a unique identifier stored at the corresponding user device.

3. The method of claim 1, wherein the each entry includes an expiry time and wherein the method further comprises deleting, from each list of advertisements, the each entry responsive to passing of the expiry time.

4. The method of claim 1, further comprising deleting a list of advertisements associated with a particular user device responsive to determining that the particular user device has been inactive for a specified period of time.

5. The method of claim 1, wherein each entry in each list of advertisements includes a respective tracking uniform resource locator (URL).

6. The method of claim 1, further comprising:
for each unicast, communicating to the external advertisement server that a replacement advertisement has been unicast.

7. The method of claim 2, wherein the unique identifier comprises at least one of:
a cost of the particular replacement advertisement; and
a length of the particular replacement advertisement.

8. The method of claim 1, wherein the existing advertisement comprises a plurality of advertisements in succession.

9. A non-transitory computer-readable medium having computer executable instructions stored thereon for execution by one or more computers, that when executed implement the method of claim 1.

10. A computer system comprising:
at least one processor;
a network adapter in communication with the at least one processor;
a memory in communication with the at least one processor, the memory storing instructions that, when executed by the at least one processor, cause the computer system to:
retrieve a plurality of lists of advertisements from an external advertisement server, where each list in the plurality of lists of advertisements:
is associated with a corresponding user device among a plurality of user devices; and
contains a plurality of entries, each entry among the plurality of entries referencing a replacement advertisement for the corresponding user device;
wherein the retrieving is based, at least in part, on a characteristic of a user associated with the corresponding user device;
download, from the external advertisement server and for each user device among the plurality of user devices, a plurality of replacement advertisements among the replacement advertisements referenced by entries contained in the list associated with the each user device;
store, at an advertisement buffering server, the plurality of replacement advertisements downloaded from the external advertisement server; and
in response to being notified that an existing advertisement has been detected in a video stream, the video stream further containing program content, and the video stream representing a linear channel of content, cause the computer system to:
identify specific user devices among the plurality of user devices, where the specific user devices are playing back the linear channel of content as provided by a broadcaster over a packet-switched network;
select, for each user device among the specific user devices, a particular replacement advertisement from among the plurality of replacement advertisements downloaded for the each user device from the external advertisement server, the selecting based, at least in part, on a length of the existing advertisement;
notify the broadcaster of the particular replacement advertisement to be played at the specific user devices instead of the existing advertisement;
instruct the broadcaster to unicast, to each of the specific user devices, over the packet-switched network, each particular replacement advertisement, accessed from the advertisement buffering server, instead of the existing advertisement;
receive, from the broadcaster, notification that the particular replacement advertisement has started playing at each user device among the specific user devices; and
track, by calling a tracking URL associated with the particular replacement advertisement and responsive to receiving the notification from the broadcaster, playback of the particular replacement advertisement at each of the specific user devices.

11. The system of claim 10, wherein the memory further stores instructions that, when executed by the at least one processor, cause the computer system to:
communicate, to the external advertisement server, when the particular replacement advertisement begins playing and when the particular replacement advertisement stops playing.

12. A method comprising:
retrieving a plurality of lists of advertisements from an external advertisement server, where each list in the plurality of lists of advertisements:
is associated with a corresponding user device among a plurality of user devices; and
contains a plurality of entries, each entry among the plurality of entries referencing a replacement advertisement for the corresponding user device;
wherein the retrieving is based, at least in part, on a characteristic of a user associated with the corresponding user device;
downloading, from the external advertisement server and for each user device among the plurality of user devices, a plurality of replacement advertisements among the replacement advertisements referenced by entries contained in the list associated with the each user device;
storing, at an advertisement buffering server, the plurality of replacement advertisements downloaded from the external advertisement server;
detecting in near-real time, an existing advertisement in a video stream, the video stream further containing program content, and the video stream representing a linear channel of content, including detecting a start time and a duration of the existing advertisement;
identifying specific user devices among the plurality of user devices, where the specific user devices are playing back the linear channel over a packet-switched network;
selecting, for each user device among the specific user devices, a particular replacement advertisement from among the plurality of replacement advertisements downloaded for the each user device from the external advertisement server, the selecting based, at least in part, on a length of the existing advertisement and on characteristics of a user associated with each user device;

replacing, for each user device among the specific user devices, the existing advertisement with the particular replacement advertisement accessed from the advertisement buffering server to, thereby, form a replacement video stream unique to the each user device, in which replacement video stream the existing advertisement has been replaced with the particular replacement advertisement for transmission to the each user device over the packet-switched network;

unicasting, to the each user device among the specific user devices, the replacement video stream as a single video stream unique to the each user device over the packet-switched network, instead of the video stream containing the existing advertisement; and tracking, by calling a tracking URL associated with the particular replacement advertisement, playback of the particular replacement advertisement by each user device among the specific user devices.

13. A non-transitory computer-readable medium having computer executable instructions stored thereon for execution by one or more computing, that when executed perform the method of claim 12.

14. The method of claim 1, further comprising determining that the number of entries in a list of advertisements is less than a specified threshold; and responsive to the determining, retrieving, from the external advertisement server, additional entries for each list of advertisements.

15. The method of claim 1, wherein the instructing the broadcaster to unicast the replacement video stream comprises providing the broadcaster with a unique identifier associated with each user device among the plurality of user devices.

16. The method of claim 1, wherein the tracking comprises identifying a portion of the particular replacement advertisement that has been played back, the method further comprising, in response to the tracking:

notifying the external advertisement server that the portion of the particular replacement advertisement in the replacement video stream has been played back;

instructing the external advertisement server to update the list of advertisements associated with the corresponding user device to, thereby, generate an updated list indicating that that playback of the portion of the replacement advertisement has been completed; and selecting an additional replacement advertisement for the corresponding user device, wherein the selecting the additional replacement advertisement is based on the updated list.

17. The method of claim 16, wherein the identifying the portion of the particular replacement advertisement that was played back further comprises periodically calling the tracking URL associated with the particular replacement advertisement until a stop notification has been received, wherein the stop notification indicates that playback of the particular replacement advertisement has stopped.

18. The method of claim 1, wherein the characteristic of the user comprises a language.

19. The method of claim 1, wherein the characteristic of the user comprises a region.

* * * * *